US012714939B2

(12) United States Patent
Sanders

(10) Patent No.: US 12,714,939 B2
(45) Date of Patent: Aug. 25, 2026

(54) METHODS AND SYSTEMS FOR APPLYING MACHINE LEARNING TO GENERATE GAMEPLAY AUDIO

(71) Applicant: Activision Publishing, Inc., Santa Monica, CA (US)

(72) Inventor: Michael Sanders, San Luis Obispo, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 420 days.

(21) Appl. No.: 18/397,529

(22) Filed: Dec. 27, 2023

(65) Prior Publication Data

US 2024/0216810 A1 Jul. 4, 2024

Related U.S. Application Data

(60) Provisional application No. 63/477,915, filed on Dec. 30, 2022.

(51) Int. Cl.
*A63F 13/55* (2014.01)
*A63F 13/58* (2014.01)
*A63F 13/60* (2014.01)

(52) U.S. Cl.
CPC .............. *A63F 13/55* (2014.09); *A63F 13/58* (2014.09); *A63F 13/60* (2014.09)

(58) Field of Classification Search
CPC .......... A63F 13/55; A63F 13/58; A63F 13/60; A63F 13/65; A63F 13/67; A63F 13/77
See application file for complete search history.

(56) References Cited

U.S. PATENT DOCUMENTS 5,530,796 A 6/1996 Wang
5,561,736 A 10/1996 Moore
5,563,946 A 10/1996 Cooper
5,685,775 A 11/1997 Bakoglu
5,706,507 A 1/1998 Schloss
5,708,764 A 1/1998 Borrel
5,736,985 A 4/1998 Lection
5,737,416 A 4/1998 Cooper
5,745,678 A 4/1998 Herzberg
5,768,511 A 6/1998 Galvin
5,825,877 A 10/1998 Dan
5,835,692 A 11/1998 Cragun
5,878,233 A 3/1999 Schloss
5,883,628 A 3/1999 Mullaly
(Continued)

FOREIGN PATENT DOCUMENTS

AU 2005215048 10/2011
CA 2143874 6/2000
(Continued)

*Primary Examiner* — Jasson H Yoo
(74) *Attorney, Agent, or Firm* — Novel IP

(57) ABSTRACT

A system and method generate audio reactions for a virtual game character that closely resembles reactions of a human player in a multiplayer video game environment. The method includes capturing reactions of human players and correlating the captured reactions with one or more coinciding game events that have triggered those reactions. The correlated information is used to train a neural network that subsequently aids in generating audio reactions for non-player characters during a similar game event.

20 Claims, 4 Drawing Sheets

(56) References Cited

U.S. PATENT DOCUMENTS 5,900,879 A 5/1999 Berry
5,903,266 A 5/1999 Berstis
5,903,271 A 5/1999 Bardon
5,911,045 A 6/1999 Leyba
5,920,325 A 7/1999 Morgan
5,923,324 A 7/1999 Berry
5,969,724 A 10/1999 Berry
5,977,979 A 11/1999 Clough
5,990,888 A 11/1999 Blades
6,014,145 A 1/2000 Bardon
6,025,839 A 2/2000 Schell
6,059,842 A 5/2000 Dumarot
6,069,632 A 5/2000 Mullaly
6,081,270 A 6/2000 Berry
6,081,271 A 6/2000 Bardon
6,091,410 A 7/2000 Lection
6,094,196 A 7/2000 Berry
6,098,056 A 8/2000 Rusnak
6,104,406 A 8/2000 Berry
6,111,581 A 8/2000 Berry
6,134,588 A 10/2000 Guenthner
6,144,381 A 11/2000 Lection
6,148,328 A 11/2000 Cuomo
6,185,614 B1 2/2001 Cuomo
6,201,881 B1 3/2001 Masuda
6,222,551 B1 4/2001 Schneider
6,271,842 B1 8/2001 Bardon
6,271,843 B1 8/2001 Lection
6,282,547 B1 8/2001 Hirsch
6,311,206 B1 10/2001 Malkin
6,334,141 B1 12/2001 Varma
6,336,134 B1 1/2002 Varma
6,337,700 B1 1/2002 Kinoe
6,353,449 B1 3/2002 Gregg
6,356,297 B1 3/2002 Cheng
6,411,312 B1 6/2002 Sheppard
6,426,757 B1 7/2002 Smith
6,445,389 B1 9/2002 Bossen
6,452,593 B1 9/2002 Challener
6,462,760 B1 10/2002 Cox, Jr.
6,469,712 B1 10/2002 Hilpert, Jr.
6,473,085 B1 10/2002 Brock
6,499,053 B1 12/2002 Marquette
6,505,208 B1 1/2003 Kanevsky
6,525,731 B1 2/2003 Suits
6,549,933 B1 4/2003 Barrett
6,567,109 B1 5/2003 Todd
6,618,751 B1 9/2003 Challenger
RE38,375 E 12/2003 Herzberg
6,657,617 B2 12/2003 Paolini
6,657,642 B1 12/2003 Bardon
6,684,255 B1 1/2004 Martin
6,717,600 B2 4/2004 Dutta
6,734,884 B1 5/2004 Berry
6,765,596 B2 7/2004 Lection
6,781,607 B1 8/2004 Benham
6,819,669 B2 11/2004 Rooney
6,832,239 B1 12/2004 Kraft
6,836,480 B2 12/2004 Basso
6,886,026 B1 4/2005 Hanson
6,948,168 B1 9/2005 Kuprionas
RE38,865 E 11/2005 Dumarot
6,993,596 B2 1/2006 Hinton
7,028,296 B2 4/2006 Irfan
7,062,533 B2 6/2006 Brown
7,143,409 B2 11/2006 Herrero
7,209,137 B2 4/2007 Brokenshire
7,230,616 B2 6/2007 Taubin
7,249,123 B2 7/2007 Elder
7,263,511 B2 8/2007 Bodin
7,287,053 B2 10/2007 Bodin
7,305,438 B2 12/2007 Christensen
7,308,476 B2 12/2007 Mannaru
7,404,149 B2 7/2008 Fox
7,426,538 B2 9/2008 Bodin
7,427,980 B1 9/2008 Partridge
7,428,588 B2 9/2008 Berstis
7,429,987 B2 9/2008 Leah
7,436,407 B2 10/2008 Doi
7,439,975 B2 10/2008 Hsu
7,443,393 B2 10/2008 Shen
7,447,996 B1 11/2008 Cox
7,467,181 B2 12/2008 McGowan
7,475,354 B2 1/2009 Guido
7,478,127 B2 1/2009 Creamer
7,484,012 B2 1/2009 Hinton
7,503,007 B2 3/2009 Goodman
7,506,264 B2 3/2009 Polan
7,515,136 B1 4/2009 Kanevsky
7,525,964 B2 4/2009 Astley
7,552,177 B2 6/2009 Kessen
7,565,650 B2 7/2009 Bhogal
7,571,224 B2 8/2009 Childress
7,571,389 B2 8/2009 Broussard
7,580,888 B2 8/2009 Ur
7,596,596 B2 9/2009 Chen
7,640,587 B2 12/2009 Fox
7,667,701 B2 2/2010 Leah
7,698,656 B2 4/2010 Srivastava
7,702,784 B2 4/2010 Berstis
7,714,867 B2 5/2010 Doi
7,719,532 B2 5/2010 Schardt
7,719,535 B2 5/2010 Tadokoro
7,734,691 B2 6/2010 Creamer
7,737,969 B2 6/2010 Shen
7,743,095 B2 6/2010 Goldberg
7,747,679 B2 6/2010 Galvin
7,765,478 B2 7/2010 Reed
7,768,514 B2 8/2010 Pagan
7,773,087 B2 8/2010 Fowler
7,774,407 B2 8/2010 Daly
7,782,318 B2 8/2010 Shearer
7,792,263 B2 9/2010 D Amora
7,792,801 B2 9/2010 Hamilton, II
7,796,128 B2 9/2010 Radzikowski
7,808,500 B2 10/2010 Shearer
7,814,152 B2 10/2010 McGowan
7,827,318 B2 11/2010 Hinton
7,843,471 B2 11/2010 Doan
7,844,663 B2 11/2010 Boutboul
7,847,799 B2 12/2010 Taubin
7,856,469 B2 12/2010 Chen
7,873,485 B2 1/2011 Castelli
7,882,222 B2 2/2011 Dolbier
7,882,243 B2 2/2011 Ivory
7,884,819 B2 2/2011 Kuesel
7,886,045 B2 2/2011 Bates
7,890,623 B2 2/2011 Bates
7,893,936 B2 2/2011 Shearer
7,904,829 B2 3/2011 Fox
7,921,128 B2 4/2011 Hamilton, II
7,940,265 B2 5/2011 Brown
7,945,620 B2 5/2011 Bou-Ghannam
7,945,802 B2 5/2011 Hamilton, II
7,970,837 B2 6/2011 Lyle
7,970,840 B2 6/2011 Cannon
7,985,138 B2 7/2011 Acharya
7,990,387 B2 8/2011 Hamilton, II
7,996,164 B2 8/2011 Hamilton, II
8,001,161 B2 8/2011 Finn
8,004,518 B2 8/2011 Fowler
8,005,025 B2 8/2011 Bodin
8,006,182 B2 8/2011 Bates
8,013,861 B2 9/2011 Hamilton, II
8,018,453 B2 9/2011 Fowler
8,018,462 B2 9/2011 Bhogal
8,019,797 B2 9/2011 Hamilton, II
8,019,858 B2 9/2011 Bauchot
8,022,948 B2 9/2011 Garbow
8,022,950 B2 9/2011 Brown
8,026,913 B2 9/2011 Garbow
8,028,021 B2 9/2011 Reisinger
8,028,022 B2 9/2011 Brownholtz
8,037,416 B2 10/2011 Bates

(56) References Cited

U.S. PATENT DOCUMENTS 8,041,614 B2 10/2011 Bhogal
8,046,700 B2 10/2011 Bates
8,051,462 B2 11/2011 Hamilton, II
8,055,656 B2 11/2011 Cradick
8,056,121 B2 11/2011 Hamilton, II
8,057,307 B2 11/2011 Berstis
8,062,130 B2 11/2011 Smith
8,063,905 B2 11/2011 Brown
8,070,601 B2 12/2011 Acharya
8,082,245 B2 12/2011 Bates
8,085,267 B2 12/2011 Brown
8,089,481 B2 1/2012 Shearer
8,092,288 B2 1/2012 Theis
8,095,881 B2 1/2012 Reisinger
8,099,338 B2 1/2012 Betzler
8,099,668 B2 1/2012 Garbow
8,102,334 B2 1/2012 Brown
8,103,640 B2 1/2012 Lo
8,103,959 B2 1/2012 Cannon
8,105,165 B2 1/2012 Karstens
8,108,774 B2 1/2012 Finn
8,113,959 B2 2/2012 De Judicibus
8,117,551 B2 2/2012 Cheng
8,125,485 B2 2/2012 Brown
8,127,235 B2 2/2012 Haggar
8,127,236 B2 2/2012 Hamilton, II
8,128,487 B2 3/2012 Hamilton, II
8,131,740 B2 3/2012 Cradick
8,132,235 B2 3/2012 Bussani
8,134,560 B2 3/2012 Bates
8,139,060 B2 3/2012 Brown
8,139,780 B2 3/2012 Shearer
8,140,340 B2 3/2012 Bhogal
8,140,620 B2 3/2012 Creamer
8,140,978 B2 3/2012 Betzler
8,140,982 B2 3/2012 Hamilton, II
8,145,676 B2 3/2012 Bhogal
8,145,725 B2 3/2012 Dawson
8,149,241 B2 4/2012 Do
8,151,191 B2 4/2012 Nicol, II
8,156,184 B2 4/2012 Kurata
8,165,350 B2 4/2012 Fuhrmann
8,171,407 B2 5/2012 Huang
8,171,408 B2 5/2012 Dawson
8,171,559 B2 5/2012 Hamilton, II
8,174,541 B2 5/2012 Greene
8,176,421 B2 5/2012 Dawson
8,176,422 B2 5/2012 Bergman
8,184,092 B2 5/2012 Cox
8,184,116 B2 5/2012 Finn
8,185,450 B2 5/2012 Mcvey
8,185,829 B2 5/2012 Cannon
8,187,067 B2 5/2012 Hamilton, II
8,199,145 B2 6/2012 Hamilton, II
8,203,561 B2 6/2012 Carter
8,214,335 B2 7/2012 Hamilton, II
8,214,433 B2 7/2012 Dawson
8,214,750 B2 7/2012 Hamilton, II
8,214,751 B2 7/2012 Dawson
8,217,953 B2 7/2012 Comparan
8,219,616 B2 7/2012 Dawson
8,230,045 B2 7/2012 Kawachiya
8,230,338 B2 7/2012 Dugan
8,233,005 B2 7/2012 Finn
8,234,234 B2 7/2012 Shearer
8,234,579 B2 7/2012 Do
8,239,775 B2 8/2012 Beverland
8,241,131 B2 8/2012 Bhogal
8,245,241 B2 8/2012 Hamilton, II
8,245,283 B2 8/2012 Dawson
8,265,253 B2 9/2012 D Amora
8,310,497 B2 11/2012 Comparan
8,334,871 B2 12/2012 Hamilton, II
8,360,886 B2 1/2013 Karstens
8,364,804 B2 1/2013 Childress
8,425,326 B2 4/2013 Chudley
8,442,946 B2 5/2013 Hamilton, II
8,506,372 B2 8/2013 Chudley
8,514,249 B2 8/2013 Hamilton, II
8,554,841 B2 10/2013 Kurata
8,607,142 B2 12/2013 Bergman
8,607,356 B2 12/2013 Hamilton, II
8,624,903 B2 1/2014 Hamilton, II
8,626,836 B2 1/2014 Dawson
8,692,835 B2 4/2014 Hamilton, II
8,721,412 B2 5/2014 Chudley
8,827,816 B2 9/2014 Bhogal
8,838,640 B2 9/2014 Bates
8,849,917 B2 9/2014 Dawson
8,911,296 B2 12/2014 Chudley
8,992,316 B2 3/2015 Smith
9,083,654 B2 7/2015 Dawson
9,152,914 B2 10/2015 Haggar
9,205,328 B2 12/2015 Bansi
9,286,731 B2 3/2016 Hamilton, II
9,299,080 B2 3/2016 Dawson
9,364,746 B2 6/2016 Chudley
9,525,746 B2 12/2016 Bates
9,583,109 B2 2/2017 Kurata
9,682,324 B2 6/2017 Bansi
9,764,244 B2 9/2017 Bansi
9,789,406 B2 10/2017 Marr
9,808,722 B2 11/2017 Kawachiya
2009/0113448 A1 4/2009 Smith
2014/0344725 A1 11/2014 Bates
2016/0191671 A1 6/2016 Dawson
2024/0382854 A1* 11/2024 Pedersen ................ A63F 13/67

FOREIGN PATENT DOCUMENTS

CA 2292678 7/2005
CA 2552135 7/2013
CN 1334650 A 2/2002
CN 1141641 C 3/2004
CN 1494679 A 5/2004
CN 1219384 9/2005
CN 1307544 3/2007
CN 100407675 7/2008
CN 100423016 C 10/2008
CN 100557637 11/2009
CN 101001678 B 5/2010
CN 101436242 12/2010
CN 101801482 B 12/2014
EP 668583 8/1995
EP 0627728 B1 9/2000
EP 0717337 B1 8/2001
EP 0679977 B1 10/2002
EP 0679978 B1 3/2003
EP 0890924 B1 9/2003
EP 1377902 B1 8/2004
EP 0813132 B1 1/2005
EP 1380133 B1 3/2005
EP 1021021 B1 9/2005
EP 0930584 B1 10/2005
EP 0883087 B1 8/2007
EP 1176828 B1 10/2007
EP 2076888 B1 7/2015
GB 2339938 10/2002
GB 2352154 7/2003
JP 3124916 B2 1/2001
JP 3177221 B2 6/2001
JP 3199231 B2 8/2001
JP 3210558 B2 9/2001
JP 3275935 2/2002
JP 3361745 1/2003
JP 3368188 B2 1/2003
JP 3470955 B 9/2003
JP 3503774 12/2003
JP 3575598 7/2004
JP 3579823 B 7/2004
JP 3579154 B2 10/2004
JP 3701773 B2 10/2005
JP 3777161 3/2006
JP 3914430 B 2/2007

(56) References Cited

FOREIGN PATENT DOCUMENTS

| | | | | | |
|---|---|---|---|---|---|
| JP | 3942090 | B | | 4/2007 | |
| JP | 3962361 | | | 5/2007 | |
| JP | 4009235 | B | | 9/2007 | |
| JP | 4225376 | | | 12/2008 | |
| JP | 4653075 | | | 12/2010 | |
| JP | 5063698 | B | | 8/2012 | |
| JP | 5159375 | B2 | | 3/2013 | |
| JP | 5352200 | B2 | | 11/2013 | |
| JP | 5734566 | B2 | | 6/2015 | |
| KR | 20210021501 | A | * | 2/2021 | ......... G10L 21/0208 |
| MY | 117864 | A | | 8/2004 | |
| SG | 55396 | | | 12/1998 | |
| WO | 2002073457 | | | 9/2002 | |
| WO | 20020087156 | | | 10/2002 | |
| WO | 2004086212 | | | 10/2004 | |
| WO | 2005079538 | | | 9/2005 | |
| WO | 2007101785 | | | 9/2007 | |
| WO | 2008037599 | | | 4/2008 | |
| WO | 2008074627 | | | 6/2008 | |
| WO | 2008095767 | | | 8/2008 | |
| WO | 2009037257 | | | 3/2009 | |
| WO | 2009104564 | | | 8/2009 | |
| WO | 2010096738 | A1 | | 8/2010 | |

* cited by examiner

METHODS AND SYSTEMS FOR APPLYING MACHINE LEARNING TO GENERATE GAMEPLAY AUDIO

CROSS-REFERENCE

The present application relies on U.S. Patent Provisional Application No. 63/477,915, titled "Methods and System for Applying Machine Learning to Generate Gameplay Audio" and filed on Dec. 30, 2022, for priority, which is herein incorporated by reference in its entirety.

FIELD

The present specification is related generally to the field of video games and audio processing. More specifically, the present specification is related to training a neural network to generate audio reactions for gameplay events during runtime.

BACKGROUND

Networked video games have exploded in popularity due to, in part, game hosting services, which include console-based services such as Microsoft's Xbox LIVE®, Sony's PlayStation Network®, and PC-based game hosting services, which enable gamers all over the world to play with or against one another using their end user devices (for example, consoles, PCs, among other devices).

Generally, networked video games involve a host computer (which is typically, though not necessarily, a server device) that provides a gameplay session in which a video game is played on an end user device over a network. Many networked video games involve a multiplayer video game in which two or more players play in a gameplay session in either a cooperative or adversarial relationship. At least one of the players may comprise a human player, while one or more other players may comprise either non-player characters (NPCs) and/or other human players.

Additionally, online, networked games offer a wide set of engagement features to players. One available feature is the ability for a player to communicate with other players of an online, networked game during gameplay. The communication encourages players to coordinate amongst themselves and engage further with the game. Often, the players communicate and coordinate with their friends, their clan, players they may be engaged in battle with, and other players, using an in-game platform, typically provided within the game interface only. In-game communication functionality provided by many games enable players to use features such as in-game text, voice, and/or video chat where players can communicate with other players of the game.

The use of voice chat during virtual game sessions enables players to communicate in real-time with each other, while also allowing them to exchange their reactions to various experiences during gameplay. In-game voice chat therefore develops social bonding between players and enhances the online gaming experience. Technologies such as Voice over IP (VOIP) can be integrated into online video games to enable real-time voice chat. Alternatively, discrete or non-integrated voice applications such as Ventrilo®, TeamSpeak®, Discord®, and Xfire®, could be used to support voice communication with online games.

In online gaming, a NPC may comprise a player not controlled by a human user. For example, a NPC may be controlled by game logic (such as artificial intelligence). A game developer or others may design a NPC to perform one or more functions of a human-controlled player. NPCs are continually being developed to imitate human players so as to increasingly blur any distinction between NPCs and human players. Several programs are being developed to simulate NPC behavior that would mimic the behavior of human players in a similar environment. In networked video games, however, certain real-world factors such as a human player reaction to various types of events during a gameplay session may be difficult to simulate. As a result, current gaming environments are limited in their ability to generate NPCs that closely resemble actual human players. Further, artificially stimulated voice characteristics of NPCs can contribute to a disruption in the illusion and the overall virtual experience within a gaming environment. Thus, what is needed are methods and systems to enhance an immersive online gaming experience by generating voice reactions for NPCs that simulate, approximate, and/or are more identical to real-world reactions of human players.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a video game content publication system for publishing data acquired and/or generated by one or more video game servers, wherein each of the one or more video game servers is configured to host and manage at least one video game and wherein each of the one or more video game servers is in data communication with remotely located client devices configured to execute an instance of the at least one video game, the system comprising: one or more first programmatic modules, implemented in the one or more of the video game servers, configured to acquire voice data from a first application executing at least partially in at least one of the remotely located client devices; one or more second programmatic modules, implemented in the one or more of the video game servers, configured to acquire at least one first gameplay event matching a first criteria from the instance of the at least one video game executing in the at least one of the remotely located client devices, wherein the instance of the at least one video game is programmatically separate from, and executes independently from, the first application; one or more third programmatic modules, implemented in the one or more of the video game servers, configured to correlate a portion of the voice data with the at least one gameplay event; a neural network configured to receive and process the at least one gameplay event and voice data correlated with the at least one gameplay event and generate a first audio output associated with the first criteria; and one or more fourth programmatic modules, implemented on one or more of the plurality of distributed video game servers, configured to provide the first audio output in response to a second gameplay event where the second gameplay matches the first criteria.

Optionally, the one or more third programmatic modules are configured to correlate the portion of the voice data with the at least one gameplay event based on time data.

Optionally, the first criteria is at least one of a celebration, a loss, killing an opponent, or being killed.

Optionally, the video game content publication system further comprises a database in data communication with the one or more first programmatic modules, the one or more second programmatic modules, and the one or more third programmatic modules, wherein the database is configured to receive and store the voice data and the correlated first gameplay event.

Optionally, the one or more first programmatic modules is configured to continually monitor the voice data.

Optionally, the one or more fourth programmatic modules is configured to provide the first audio output in association with a non-player character reaction.

Optionally, the one or more fourth programmatic modules is configured to provide the first audio output in association with a player character reaction in response to a setting configured to use the first audio output for the player character.

Optionally, the video game content publication system further comprises one or more fifth programmatic modules configured to remove abusive or offensive content from the voice data.

Optionally, the video game content publication system further comprises at least one filter to select voice data for generating the first audio output based on a profile of a player engaged with the at least one video game. Optionally, the profile of the player comprises engagement information of the player with the at least one video game. Optionally, the profile of the player comprises language spoken by the player. Optionally, the profile of the player comprises location of the player.

Optionally, the neural network is further configured to receive and process feedback from at least one of the remotely located client devices, wherein the feedback is in response to the first audio output.

Optionally, the neural network is configured to process the voice data correlated with the at least one gameplay event using a large language model. Optionally, the large language model is configured to reinforce learning based on learning by the neural network. Optionally, the large language model is configured based on at least one of, or a combination of one or more of, parameters associated with the at least one video game at least one of the plurality of the client devices and comprising: a proximity, animation, a gamepad signal, an audio input, player emotions, engagement metrics, player profile information, or a game mechanic event. Optionally, the large language model is an existing large language model.

The present specification also discloses a method for video game content publication for publishing data acquired and/or generated by one or more video game servers, wherein each of the one or more video game servers is configured to host and manage at least one video game and wherein each of the one or more video game servers is in data communication with remotely located client devices configured to execute an instance of the at least one video game, the method comprising: acquiring voice data from a first application executing at least partially in at least one of the remotely located client devices; acquiring at least one first gameplay event matching a first criteria from the instance of the at least one video game executing in the at least one of the remotely located client devices, wherein the instance of the at least one video game is programmatically separate from, and executes independently from, the first application; correlating a portion of the voice data with the at least one gameplay event; using a neural network to receive and process the at least one gameplay event and voice data correlated with the at least one gameplay event, to generate a first audio output associated with the first criteria; and providing the first audio output in response to a second gameplay event where the second gameplay matches the first criteria.

Optionally, the correlating comprises correlating the portion of the voice data with the at least one gameplay event based on time data.

Optionally, the providing comprises providing the first audio output in association with a non-player character reaction or a player character reaction.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
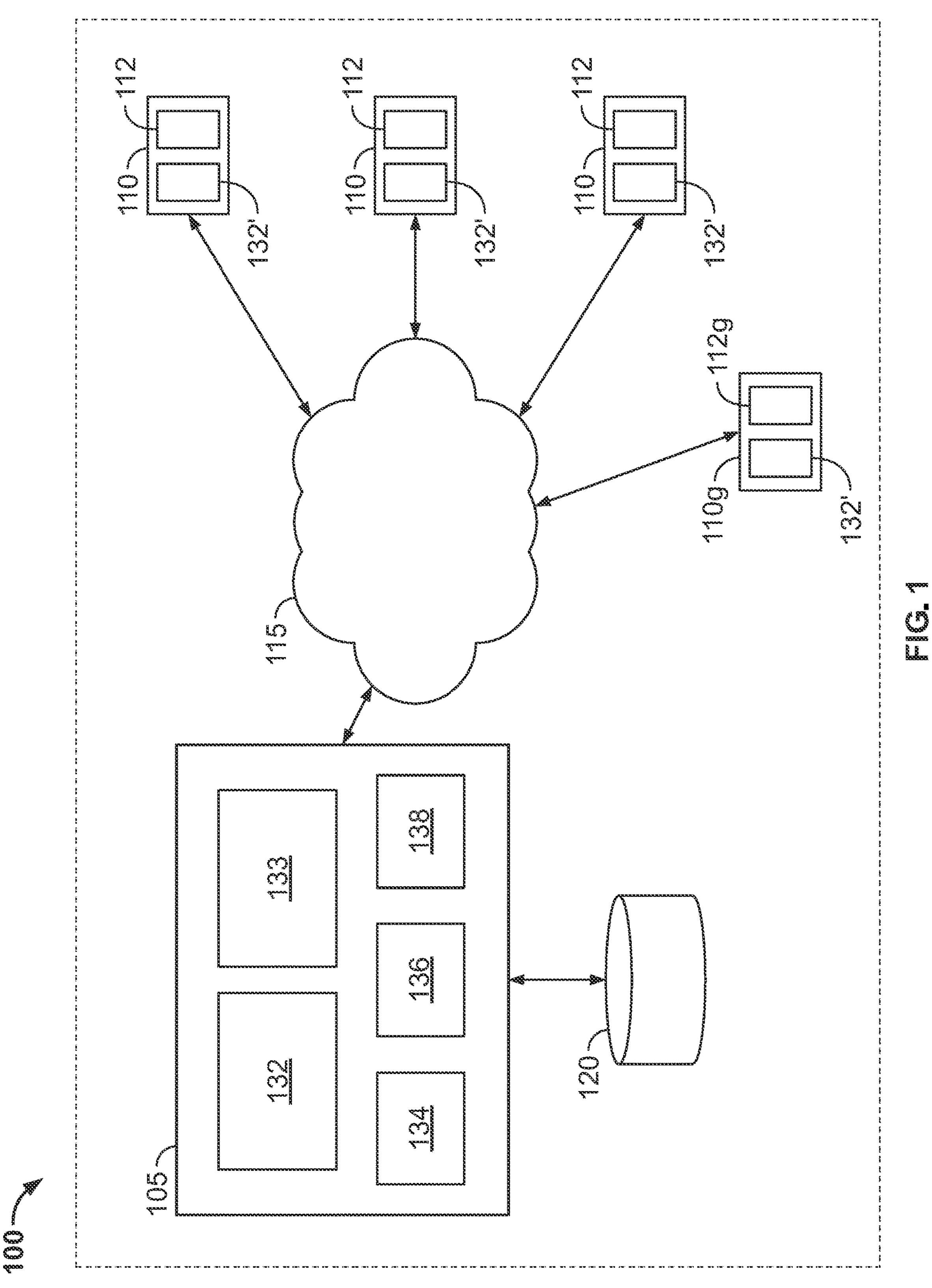
FIG. 1 is a block diagram showing a client-server architecture in which systems and methods of the present specification may be implemented, in accordance with some embodiments of the present specification.

The present specification is directed toward systems and methods that capture reactions of human players engaged in or interacting in an online gaming environment, together with an event/trigger during the gameplay that immediately precedes or coincides with and is correlated with the reactions. The reactions may be in the form of voice reactions (audio) or gestures and movements (animations and video) presented by the human players. The captured reactions and the correlated gameplay event/trigger are used to train a neural network to generate reactions for Non-Player Characters (NPCs) during similar gameplay events or triggers.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, the system includes at least one processor capable of processing programmatic instructions, has a memory capable of storing programmatic instructions, and employs software comprised of a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enables or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming, controlling and/or configuring a general-purpose processor. Stated differently, in some embodiments, a module, application or engine implements a plurality of instructions or programmatic code to cause a general-purpose processor (as it is configured to do so) to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "platform" or "target gaming platform" used in this disclosure may refer to hardware and/or software specifications of a player's client device (which may be a PC or a gaming console, for example). In some embodiments, "platform" may refer to at least GPU (Graphics Processing Unit) specification, CPU specification, display screen resolution, RAM and hard disk space available and a type of operating system.

The term "offline" or "offline process" used in this disclosure refers to one or more programmatic instructions or code that may be implemented or executed while the game is not being played by any player (that is, while the one or more game servers are not rendering a game for playing).

The term "runtime" or "runtime process" used in this disclosure refers to one or more programmatic instructions or code that may be implemented or executed during gameplay (that is, while the one or more game servers are rendering a game for playing).

FIG. 1 illustrates an embodiment of a multi-player online gaming or massively multi-player online gaming system/environment 100 in which the systems and methods of the present specification may be implemented or executed. The system 100 comprises client-server architecture, where one or more game servers 105 are configured to be in communication with one or more client devices 110 over a network 115. Players and non-players, such as programmers, computer graphics artists or designers, may access the system 100 via the one or more client devices 110*g*. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115. Each client device 110 is configured to enable voice communication using a voice application 112, i.e. a first application. Voice data is communicated between voice application 112 and game servers 105. Voice communication to and from client device 110 may be performed using a VoIP social or group communication platform, or any other voice-related application or messaging service that supports in-game use and voice chat or that may be integrated with a video game, such as, but not limited to Discord®, Ventrilo®, and TeamSpeak®. Preferably, the voice-related application is in the form of a separate application that is programmatically independent of, compiled separately from, and executes independently of the video game. Voice application 112 includes voice chat data that is performed during online video game sessions by human players of the video game. The voice chat may be performed between players for social purposes and/or for an increased immersive experience during gameplay.

The one or more game servers 105 may be any computing device having one or more processors and one or more computer-readable storage media such as RAM, hard disk or any other optical or magnetic media. The one or more game servers 105 include a plurality of modules configured to provide or implement a plurality of functional, operational, or service-oriented methods of the present specification. In some embodiments, the one or more game servers 105 include or are in communication with at least one database system 120. The database system 120 is configured to store audio input acquired from one or more client devices 110. The audio input includes voice data that is generated using voice application 112. The voice data further includes voices of different players engaged in a chat, where the voice chat occurs simultaneous to gameplay between the players. Therefore, voice data is parallel to but independent from game data. However, there are occasions during gameplay, such as at the time of occurrence of extraordinary events, where the players engaged with the experience of those events provide a reaction. Most of the time, the reaction is audible in the voice of the player(s) and appears in the voice chat, and therefore the voice data generated by voice application 112.

In some embodiments, the one or more game servers 105 may be implemented by a cloud of computing platforms that are configured to operate together as game servers 105. In accordance with aspects of the present specification, the one or more game servers 105 are configured to provide or implement a plurality of modules or engines such as, but not limited to, a voice acquisition module 132, a gameplay event acquisition module 133, a machine learning/training correlation module 134, a neural network 136, and a voice generation module 138. In some embodiments, the one or more client devices 110 are configured to implement or execute one or more of a plurality of client-side modules some of which are same as or similar to the modules of the one or more game servers 105. For example, in some embodiments each of the player client devices 110 is configured to execute a client-side voice acquisition and correlation module 132' (also referred to as a "client voice acquisition and correlation module 132'"). In addition, at least one non-player client device **110*g* is configured to execute the client game module 132'. The at least one non-player client device 110*g* is associated with voice communication 110*g***.

In embodiments, users of non-player client devices **110*g*, through game server 105, specify a set of criteria for identifying extraordinary events in a video game. The specific types of game events may be specified by programmers or developers such as those using client device 110*g* (see FIG. 1**). The specific events may relate to occurrences in the game that are out of the ordinary, and likely to elicit a reaction from the player/s engaged with the game. Examples of such game events may include a sudden noise like a gunfire, the moment a target is procured by the player such as a kill, the moment when the player's virtual avatar is struck such as when the player's avatar is killed in the game, losing of an opportunity to score, or any other extraordinary event. When an event occurs in the game matching the pre-specified criteria, a time associated with the occurrence of the event is used to acquire the voice data coinciding in time with the event of interest. In some embodiments, voice data for a pre-specified duration before and after the identified event of interest is acquired. The acquired voice data may include reactions of the players expressed through their voices.

Figure 2:
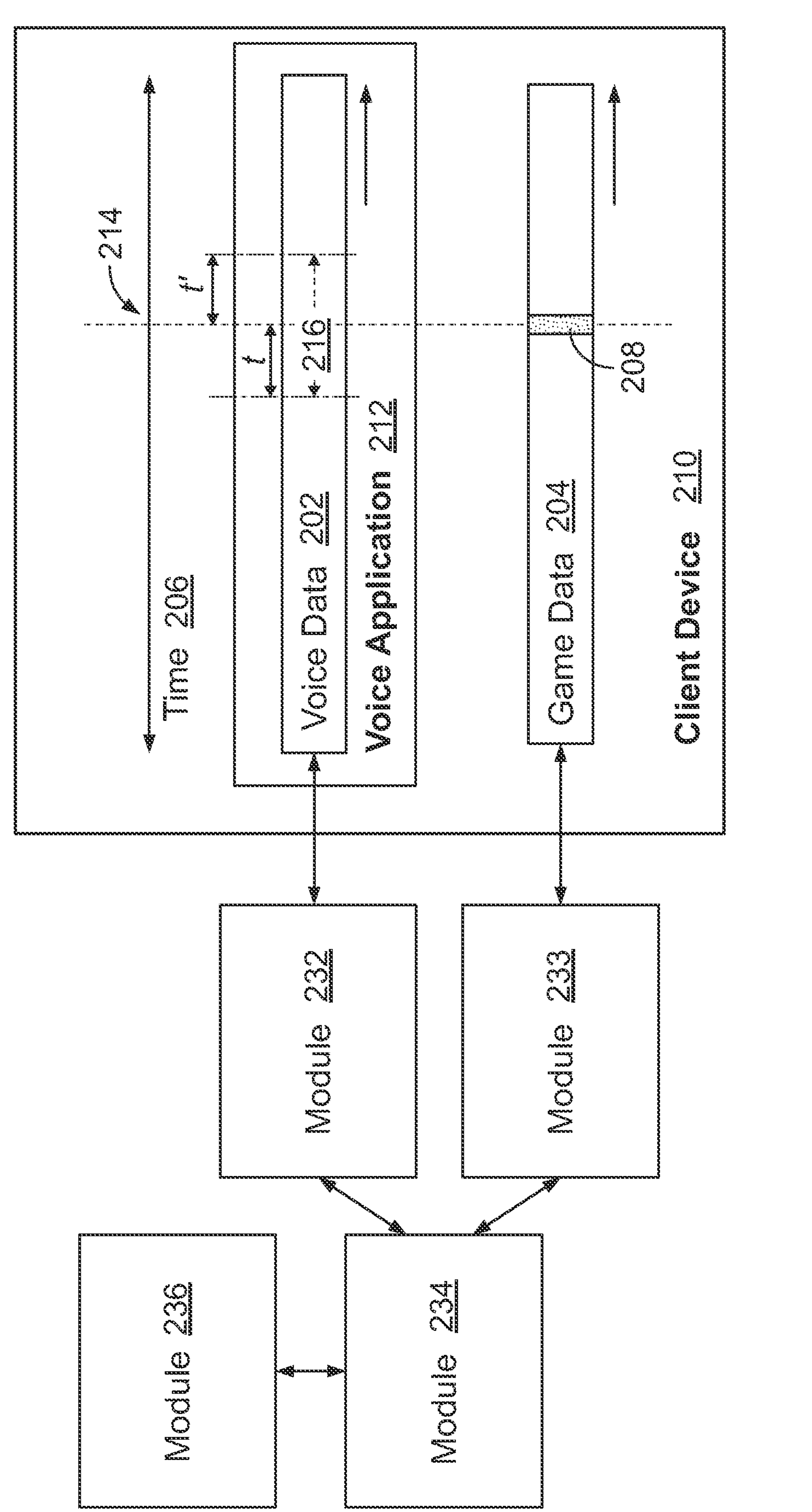
FIG. 2 is a block diagram showing an exemplary flow of the capture of voice data from a voice application on a client device during a gameplay session, in accordance with some embodiments of the present specification.

In some embodiments, modules 132 and 132' are configured to continually monitor, record/capture/acquire voice data from voice application 112 on one or more client device 110 that is generated during a gaming session. The voice data was captured and acquired during a time period corresponding to the time of occurrence of an event of interest in the game. The gameplay event data is captured and acquired by module 133. FIG. 2 illustrates an exemplary acquisition of voice data 202 by module 232 from a voice application 212 on a client device 210 during a gameplay session, in accordance with some embodiments of the present specification. In an implementation, game data 204, which includes the events of the video game contemporaneous with voice data 202, are continually monitored and acquired by module 233. Module 232 is functionally equivalent to module 132 and module 233 is functionally equivalent to module 133 described above with respect to in FIG. 1. Voice data 202 is generated parallel to game data 204, as players may chat during a gameplay session.

It should be appreciated that, in many embodiments, the voice data 202 is generated by, acquired from, captured from, and/or stored using a first software application that is executed independently from, and programmatically separate from, a second software application responsible for generating, acquiring, capturing, and/or storing game data 204 and the events that occur in the game. This separate programmatic architecture creates unique challenges in using human voice data in relation to game events which arise in completely separate programmatic environments.

In embodiments, voice data 202 is time-stamped over time-period 206. In an embodiment, module 233 monitors game data 204 to identify specific types of game events 208 (also herein referred to as 'triggers') from data 204. As described above, the specific types of game events may be specified by programmers or developers such as those using client device **110*g* (see FIG. 1). The specified type of game event 208 may occur at a time 214. Module 232 captures time-stamped voice data 202 for a pre-defined time period (t+t') before and after the time 214 when event 208 of interest has occurred. Time t is the time preceding event 208 and time t' is the time following event 208. In different embodiments, times t and t' are equal, or different. In one embodiment, time t is equal to t' which is 10 seconds. Captured voice data 216 in the given time period from t to t' are likely to contain an audio of the reactions of the players building up to and following event 208. In different scenarios, the reactions may include an excited shout or yell at the time of an unexpected noise such as a gunfire, celebratory bragging after procuring a target, and angry words after losing an opportunity to score, among other types of reactions. Other examples of triggers may include a unique pose of a virtual character, a player signal input, live input audio, or an internal game event (such as an explosion or loot drop, among other features). In the previous examples, the subsequent reactions include yelling, celebratory bragging, or angry reactions, respectively. Triggers and resulting reactions may be extended to many other examples based on the type of the video game and the experiences offered by these games to different types of players. Module 234 correlates captured voice data 216 with the corresponding event of interest 208 from game data 204**.

Module 234 is configured to record a relationship between the captured media and the gameplay event or trigger that coincided with or was simultaneous to the captured media. Further to the above examples, module 234 is configured to correlate the yelling with the burst of gunfire, the celebratory bragging with the preceding kill, and the angry reactions of a player to the preceding event/trigger of that player's avatar being killed in the video game. In embodiments, modules 232, 233, 234 (modules 132, 132', 133, 134 of FIG. 1) are configured to be in communication with database 120 to store the captured media and the correlated event for each captured media.

Figures 3, 4:
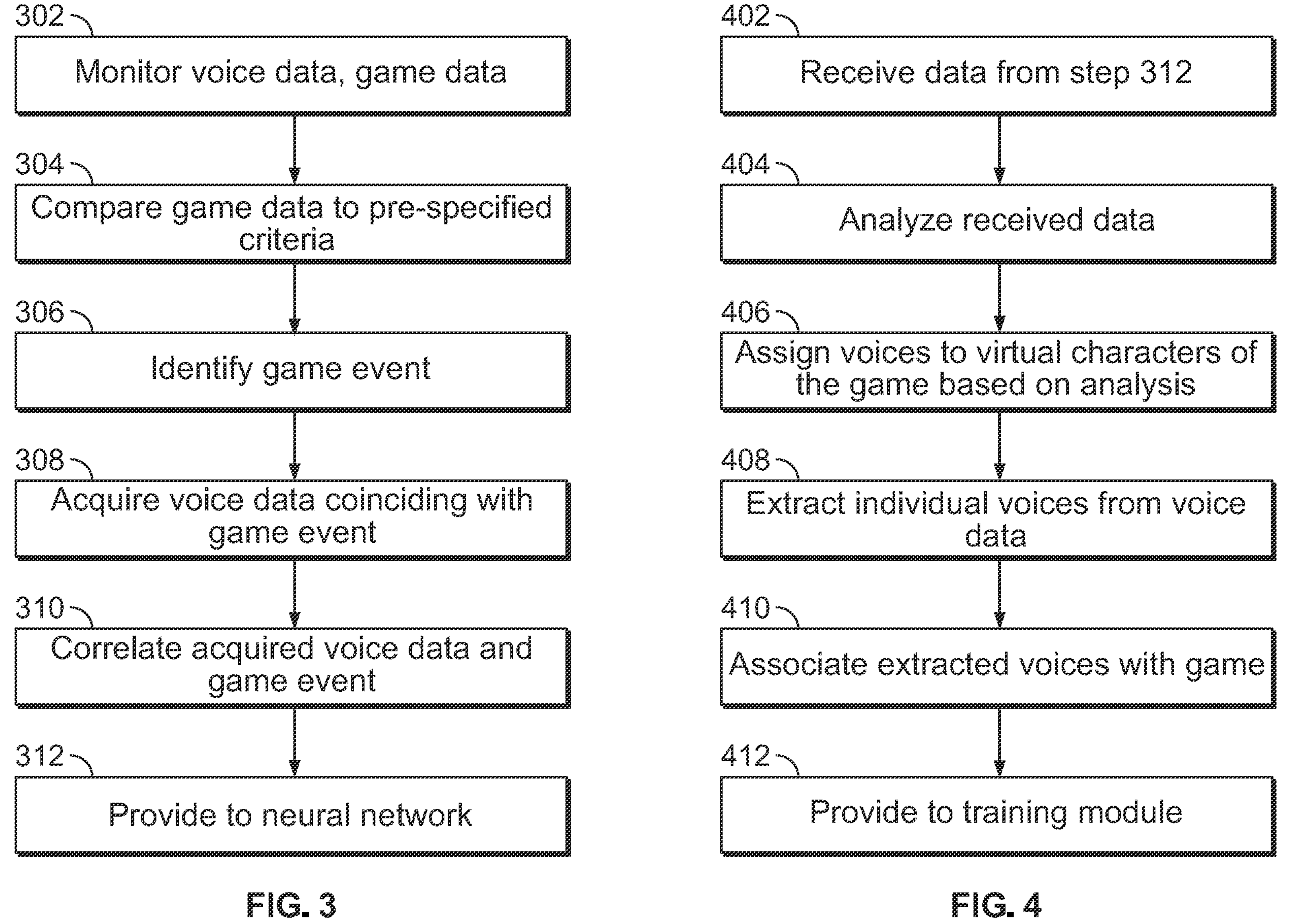
FIG. 3 is a flow diagram describing an exemplary set of steps used to acquire and correlate voice data, in accordance with some embodiments of the present specification.
FIG. 4 is a flow diagram describing an exemplary set of steps used to process the continually monitored voice data and information about the correlated acquired voice data and corresponding game event, received by a neural network, in accordance with some embodiments of the present specification.

FIG. 3 is a flow diagram showing an exemplary set of steps used to acquire and correlate voice data, in accordance with some embodiments of the present specification. It should be noted that each of the modules are configured to perform the functionality described herein and throughout the specification. At step 302, modules 132, 132' continually monitor voice data 202 from voice application 112 on client devices 110, and module 133 continually monitors game data 204 from the client devices 110. At step 304, module 134 compares the received game data 204 with pre-specified criteria defining events of interest in a video game. At step 306, a game event of interest 208 is identified by module 133, which is configured to do so based on a match with the pre-specified criteria related to events of interest. At step 308, module 132, 132' determines the time of occurrence of game event 208 and uses it to separately acquire voice data 216 coinciding in time (approximately simultaneous) with event 208. In embodiments, acquired voice data corresponds to a time period/before occurrence of event 208 and time period t' after the occurrence of event 208. Persons of the skill in the art may note that the acquired voice data is discrete from the game data. At step 310, module 134 establishes a relationship between acquired voice data 216 and game event 208, indicating that the voices captured during the stated time period are expressions of reactions of players to game event 208. At step 312, the continually monitored voice data 202, the acquired voice data 216 and the corresponding event 208 of interest are communicated to a neural network 136.

Referring again to FIG. 1, correlation data using the acquired voice data and the corresponding gameplay event from either module 134 and/or database 120 is provided to neural network 136, in the form of training data. In some embodiments, players may provide feedback to an audio reaction generated through the neural network, which is further used to retrain the selection of voice data corresponding to a gameplay event. Additionally, in embodiments, layer profiles are used to train the neural network to select specific voice data appropriate for a specific player profile. FIG. 4 is a flow diagram showing an exemplary set of steps used to process the continually monitored voice data 202 and information about both the correlated acquired voice data 216 and corresponding game event 208, received by neural network 136, in accordance with some embodiments of the present specification. Herein, game event 208 may include player profile information and player feedback. At step 402, neural network 136 receives training data from module 134. The training data includes the continually monitored voice data 202, the acquired voice data 216 for the time period t+t', along with its associated game event 208 (see FIG. 2). The training data can also include components such as player profile information and player feedback. At step 404, neural network 136 uses, as it is configured to do so, the provided training data to make predictions or decisions pertaining to gameplay events that trigger different types of player reactions. In embodiments, processes executed by neural network 136 (which is configured to execute such processes) include detection of an emotion from each voice. One or more ML techniques can be used or combined and used by neural network 136. Correlations are coded into the ML algorithms that are configured to categorize sounds/words/phrases based on audio curves/levels, emotional detection, and any other methods that a network or large language model (LLM) may be used to classify data for analysis. In some embodiments, an existing LLM that has pre-built-in classifications or parameters, is used. In some other embodiments, custom-configuration of LLM correlations is developed by manual classification or by using an adversarial neural network that is configured to evaluate the LLM output and gauge its validity to help in reinforcement learning to refine and build more accurate correlations. The detected emotions can be used for the learning of neural network 136, in order to eventually provide accurate voice output. Additionally, in some embodiments neural network 136 is configured to receive and process player engagement metrics. In an embodiment, a player's engagement within the game is monitored while providing different voice output responses. Neural network 136 is also retrained to support extended player engagement. In some embodiments, player-specific variables are used to configure the neural network and generate more accurate voice output. The variables are throttled per player based on a feedback loop or an engagement metric, such as but not limited to A/B testing, and then refining per player. Further, in some embodiments, the variables are manipulated for different types of player response. In one exemplary scenario, a whispering response from an NPC may prompt a player to get physically proximate to the gaming device. In another exemplary scenario, the ML model can learn that a player becomes more competitive when taunted, thereby increasing the player's engagement. The acquired voice data 216 and associated game event 208 are analyzed to subsequently assign voices at step 406, to virtual characters (such as NPCs) that are active in the game. The assignment occurs based on an analysis of an action of each virtual player and a correlation of those actions with the substance and emotions of the individual voices in voice data stream 202. Once correlated, at step 408, individual voices corresponding to individual virtual characters are extracted from the voice chat (obtained from voice data 202) and are associated with the game (obtained from game data 204) in the same game session, specific to the correlated virtual character. The association between the individual voices and the corresponding game session is established at step 410. At step 412, the voice associated with a corresponding virtual character is then input into voice generation module 138. Initially, a programmer may generate and provide training data to neural network 136. Training data may include specific audio and associated inputs such as proximity, animation, gamepad signal, audio input, player emotions, engagement metrics, player profile information, any type of a game mechanic event, among other examples of triggers/game events. The stated examples of audio and associated inputs/components/signals/events/mechanics/gameplay are used individually or in combination to build variable information into the LLM correlations, in order to generate a certain type of response. In an exemplary scenario, 'proximity' is used to control the voice level or intensity of the audio output response. In another exemplary scenario, events in the gaming environment such as kicking a door in, as opposed to sneaking the door open, causes an NPC voice output response to be different. Therefore, ML module 134 is configured to receive additional training data from actual gameplay events.

At step 404, voice data 202, 216, and data corresponding to game event 208, are analyzed. At step 406, the analyzed data is used to assign voices to virtual characters including but not limited to Non-Player Characters (NPCs), avatars of human players who engage with the video game without a microphone, or human players who are handicapped, or as a result of an option selected by a human player for their virtual character.

Figure 5:
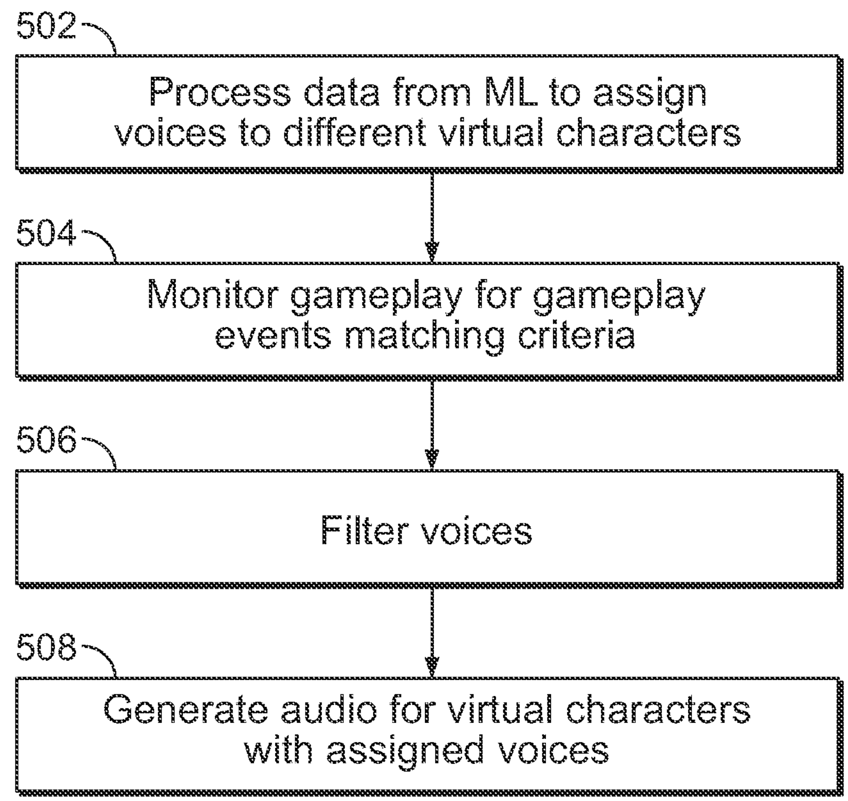
FIG. 5 is a flow diagram describing an exemplary set of steps used to process the data received from a neural network, in accordance with some embodiments of the present specification.

Data generated by neural network 136 is used by voice generation module 138 to provide audio output. In embodiments, the audio output is provided in response to a second gameplay event that matches the pre-specified criteria. In other words, the audio output is provided, for example, to a NPC, when a second gameplay event occurs which is similar to the first gameplay event. FIG. 5 is a flow diagram showing an exemplary set of steps that may be used to process data received from neural network 136, in accordance with some embodiments of the present specification. At step 502, deep learning methods used by neural network 136 process the voice and gameplay data from module 134 to assign voices to virtual game characters that may be from different gameplay sessions. These virtual characters may include, but are not limited to, Non Player Characters (NPCs), virtual representations of players with a handicap or without a microphone, or virtual representations of players who may have opted to use voices generated by embodiments of the present specification. At step 504, neural network is configured to recognize a second gameplay event matching the first gameplay event, as monitored by module 133, and triggers the voice generation module 138 to generate audio output based on the second gameplay event. At step 508, voice generation module 138 uses, as it is configured to do so, the outputs from neural network 136 to generate audio using the assigned voices for the corresponding virtual characters. In embodiments, at step 506, prior to generating the assigned voices, neural network 136 is configured to filter some of the voices. In some embodiments, the acquired media is filtered to remove abusive and/or offensive language and/or audio-gestures. In some embodiments, a filter is applied to selectively assign specific actions and/or responses that are suitable or are fitting to certain player(s). Further, layers or filters can be applied to the LLM that are location/language/player specific. In an example, the LLM has customized profile for each player that includes individualized reinforcement learning or tuning based on analytics of spend/engagement, or any other player-specific parameter. The filter for each player, in this case, is developed based on a learning of that player's profile. In an exemplary case, a player identified from the player's profile that has Spanish as their spoken language would be assigned audio responses that are fitting for a Spanish-speaking player. Further, the filter applicable for each player may evolve over time as the player profile also evolves with gaming experience. Additionally, irrespective of a player, the embodiments provide for a neural network component of reinforced learning of languages, where the component refines itself with each variety of response to an identical or similar game event, to create more accurate audio reactions that then retrain the model. The neural network is also trained based on feedback provided by a player to a specific audio reaction generated by the neural network. In some embodiments, the voice for the virtual characters is assigned in real-time during a gaming session and is generated along with the occurrence of a corresponding game event.

While FIGS. 1 and 2 illustrate an exemplary overview that presents a general frame of a network where the embodiments of the specification may be applicable, persons skilled in the art can appreciate that the embodiments of the functionalities and programs of the present specification can also be implemented by modules or engines in non-networked gaming devices, including mobile phones, consoles, and personal computers.

The present specification discloses several inventions, some of which are defined as ordered combinations, directed toward the Internet-centric challenge of enhancing an immersive online gaming experience by generating voice reactions for NPCs that simulate, approximate, and/or are more identical to real-world reactions of human players keeping. This is achieved, at least in part, by providing a server system, embodied by a plurality of programmatic instructions stored in a memory and executed on a processor, that is configured to acquire voice data from a video gaming application executing at least partially in one or more remotely located client devices, acquire at least one first gameplay event matching a first criteria from the instance of the at least one video game executing in the at least one of the remotely located client devices, correlate a portion of the voice data with the at least one gameplay event, using a neural network to receive and process the at least one gameplay event and voice data correlated with the at least one gameplay event and generate a first audio output associated with the first criteria. The audio output is provided in response to a second gameplay event that matches the first criteria. The result of this audio data processing, using the specific methods and systems disclosed herein, has several tangible, concrete benefits.

The above listed hardware and computing performance benefits are meaningful limitations because they demonstrate an effective solution to an Internet-centric problem (generating human-like automated voice responses in a networked gaming environment) with a solution that is necessarily rooted in computer technology (correlation and learning of human voice data with game events to generate automated voice responses). It should also be appreciated that, while the data transformation process relies on the use of certain mathematical algorithms, these algorithms are narrowly defined, and they are tied to a specific neural network process. These limitations are not necessary or obvious tools for achieving generation of an audio or voice output, and, accordingly, the claims do not preempt the field of generating audio output in a gaming environment.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A video game content publication system for publishing data acquired and/or generated by one or more video game servers, wherein each of the one or more video game servers is configured to host and manage at least one video game and wherein each of the one or more video game servers is in data communication with remotely located client devices configured to execute an instance of the at least one video game, the system comprising:
- one or more first programmatic modules, implemented in the one or more of the video game servers, configured to acquire voice data from a first application executing at least partially in at least one of the remotely located client devices;
- one or more second programmatic modules, implemented in the one or more of the video game servers, configured to acquire at least one first gameplay event matching a first criteria from the instance of the at least one video game executing in the at least one of the remotely located client devices, wherein the instance of the at least one video game is programmatically separate from, and executes independently from, the first application;
- one or more third programmatic modules, implemented in the one or more of the video game servers, configured to correlate a portion of the voice data with the at least one gameplay event;
- a neural network configured to receive and process the at least one gameplay event and voice data correlated with the at least one gameplay event and generate a first audio output associated with the first criteria; and
- one or more fourth programmatic modules, implemented on one or more of the plurality of distributed video game servers, configured to provide the first audio output in response to a second gameplay event where the second gameplay matches the first criteria.

2. The video game content publication system of claim 1, wherein the one or more third programmatic modules are configured to correlate the portion of the voice data with the at least one gameplay event based on time data.

3. The video game content publication system of claim 1, wherein the first criteria is at least one of a celebration, a loss, killing an opponent, or being killed.

4. The video game content publication system of claim 1, further comprising a database in data communication with the one or more first programmatic modules, the one or more second programmatic modules, and the one or more third programmatic modules, wherein the database is configured to receive and store the voice data and the correlated first gameplay event.

5. The video game content publication system of claim 1, wherein the one or more first programmatic modules is configured to continually monitor the voice data.

6. The video game content publication system of claim 1, wherein the one or more fourth programmatic modules is configured to provide the first audio output in association with a non-player character reaction.

7. The video game content publication system of claim 1, wherein the one or more fourth programmatic modules is configured to provide the first audio output in association with a player character reaction in response to a setting configured to use the first audio output for the player character.

8. The video game content publication system of claim 1, further comprising one or more fifth programmatic modules configured to remove abusive or offensive content from the voice data.

9. The video game content publication system of claim 1, further comprising at least one filter to select voice data for generating the first audio output based on a profile of a player engaged with the at least one video game.

10. The video game content publication system of claim 9, wherein the profile of the player comprises engagement information of the player with the at least one video game.

11. The video game content publication system of claim 9, wherein the profile of the player comprises language spoken by the player.

12. The video game content publication system of claim 9, wherein the profile of the player comprises location of the player.

13. The video game content publication system of claim 1, wherein the neural network is further configured to receive and process feedback from at least one of the remotely located client devices, wherein the feedback is in response to the first audio output.

14. The video game content publication system of claim 1, wherein the neural network is configured to process the voice data correlated with the at least one gameplay event using a large language model.

15. The video game content publication system of claim 14, wherein the large language model is configured to reinforce learning based on learning by the neural network.

16. The video game content publication system of claim 15, wherein the large language model is configured based on at least one of, or a combination of one or more of, parameters associated with the at least one video game at least one of the plurality of the client devices and comprising: a proximity, animation, a gamepad signal, an audio input, player emotions, engagement metrics, player profile information, or a game mechanic event.

17. The video game content publication system of claim 14, wherein the large language model is an existing large language model.

18. A method for video game content publication for publishing data acquired and/or generated by one or more video game servers, wherein each of the one or more video game servers is configured to host and manage at least one video game and wherein each of the one or more video game servers is in data communication with remotely located client devices configured to execute an instance of the at least one video game, the method comprising:
- acquiring voice data from a first application executing at least partially in at least one of the remotely located client devices;
- acquiring at least one first gameplay event matching a first criteria from the instance of the at least one video game executing in the at least one of the remotely located client devices, wherein the instance of the at least one video game is programmatically separate from, and executes independently from, the first application;
- correlating a portion of the voice data with the at least one gameplay event;
- using a neural network to receive and process the at least one gameplay event and voice data correlated with the at least one gameplay event, to generate a first audio output associated with the first criteria; and
- providing the first audio output in response to a second gameplay event where the second gameplay matches the first criteria.

19. The method of claim 18, wherein the correlating comprises correlating the portion of the voice data with the at least one gameplay event based on time data.

20. The method of claim 18, wherein the providing comprises providing the first audio output in association with a non-player character reaction or a player character reaction.

* * * * *